US005470643A

United States Patent [19]

Dorfman

[11] Patent Number: 5,470,643

[45] Date of Patent: Nov. 28, 1995

[54] POLYMER THICK FILM RESISTOR COMPOSITIONS

[75] Inventor: Jay R. Dorfman, Durham, N.C.

[73] Assignee: E. I. Du Pont de Nemours and Company, Wilmington, Del.

[21] Appl. No.: 260,503

[22] Filed: Jun. 15, 1994

Related U.S. Application Data

[63] Continuation of Ser. No. 944,996, Sep. 15, 1992, abandoned.

[51] Int. Cl.$^6$ ................................ B32B 5/16; C08K 3/08

[52] U.S. Cl. .......................... 428/206; 428/208; 428/323; 428/328; 428/329; 428/331; 524/439; 524/440; 524/441; 524/495; 524/496

[58] Field of Search .................................... 428/323, 328, 428/340, 206, 208, 329, 331, 412, 411.1, 473.5, 474.4, 480; 252/502, 511, 514; 524/439, 440, 441, 495, 496, 611

[56] References Cited

U.S. PATENT DOCUMENTS

| | | | |
|---|---|---|---|
| 2,795,680 | 6/1957 | Peck | 201/63 |
| 2,866,057 | 12/1958 | Peck | 201/63 |
| 3,173,885 | 3/1965 | Short | 252/503 |
| 4,479,890 | 10/1984 | Prabhu et al. | 252/508 |
| 4,516,836 | 5/1985 | Ferrato | 350/336 |
| 4,545,926 | 10/1985 | Fouts, Jr. et al. | 252/511 |
| 4,654,258 | 3/1987 | Kawamata et al. | 428/323 |
| 4,723,656 | 2/1988 | Kiernan et al. | 206/333 |
| 5,011,627 | 4/1991 | Lutz et al. | 252/512 |
| 5,049,313 | 9/1991 | Frentzel | 252/511 |
| 5,089,173 | 2/1992 | Frentzel et al. | 252/514 |
| 5,114,796 | 5/1992 | Frentzel et al. | 428/521 |
| 5,200,264 | 4/1993 | Frentzel | 428/323 |

FOREIGN PATENT DOCUMENTS

| | | |
|---|---|---|
| 51144435 | 3/1977 | Japan . |

*Primary Examiner*—D. S. Nakarani
*Assistant Examiner*—H. T. Lê

[57] ABSTRACT

A polymer thick film resistor composition is disclosed which comprises: (1) finely divided particles of a conductive metal having a surface area of 0.3 to 3.0 $m^2/g$; (2) finely divided particulate material having a surface area greater than 100 $m^2/g$; (3) a thermoplastic resin; dissolved in (4) an organic solvent having a volatility rating of 10,000 to 50,000; wherein the composition is substantially curable within 2.5 minutes by heating to a temperature of 135° C., and further wherein the volume ratio of particulate material to resin is at least 3.5, and the weight ratio of solvent to resin is 3 to 5.

12 Claims, No Drawings

POLYMER THICK FILM RESISTOR COMPOSITIONS

This is a continuation of application Ser. No. 07.944,996 filed Sep. 15, 1992, now abandoned.

FIELD OF THE INVENTION

This invention is directed to polymer thick film resistor compositions. In particular, the invention is directed to such compositions which are suitable for making resistive elements for use in voltage indicators.

BACKGROUND OF THE INVENTION

Polymer thick film (PTF) resistor compositions are screenable pastes which are used to form resistive elements in electronic applications. Such compositions contain resistive filler material dispersed in polymeric resins which remain an integral part of the final composition after processing. The compositions can be processed at relatively low temperatures, namely the temperatures required to cure the resin. The actual resistivity/conductivity of the compositions will vary depending on the desired end use. PTF materials have received wide acceptance in commercial products, notably for flexible membrane switches, touch keyboards, automotive parts and telecommunications.

Another use for PTF resistor elements is in voltage indicators for use in testing batteries. Kiernan et al., in U.S. Pat. No. 4,723,656, have described such a voltage indicator which can be integrally associated with a battery package.

The resistive elements are usually prepared by printing the PTF composition, or ink, onto a sheet in a pattern which has many replications of the resistor. It is important to have resistance uniformity across the sheet, i.e., the resistance of elements on one side of the sheet should be the same as that of elements on the opposite side. Variability in the resistance can significantly reduce the yield.

In addition, to be suitable for use in any of the above described devices, it is important that the resistive element be both compositionally and functionally stable. In particular, the change in the resistance of the resistive element over the course of time and upon extended exposure to conditions of humidity and heat must not exceed about 5–7%.

Heretofore, the resistive element for such devices has consisted of a dispersion of silver powder and carbon particles in a polyurethane or epoxy resin. However, it has been found to be difficult to produce such resistor elements with suitable resistance uniformity and stability.

SUMMARY OF THE INVENTION

The invention is therefore directed in its primary aspect to a polymer thick film resistor composition (1) finely divided conductive metal particles having a surface area of 0.3 to 3.0 $m^2/g$, (2) finely divided material particles having a surface area greater than 100 $m^2/g$, (3) a thermoplastic resin, dissolved in (4) an organic solvent, wherein the composition is substantially curable within 2.5 minutes by heating to a temperature of 135° C., and further wherein the volume ratio of particulate material to resin is at least about 3.5, and the weight ratio of solvent to resin is about 3 to about 5.

In a secondary aspect, the invention is directed to resistive elements comprising printed layers of the above-described polymer thick film ink upon a substrate, the layer having been heated to effect full curing of the polymers and conversion of the composition to the solid state.

DETAILED DESCRIPTION OF THE INVENTION

Polymer thick film inks are generally printed onto a substrate, e.g., polyethylene terephthalate, and then cured, i.e., dried, by heating, to form a resistive element. To be acceptable, an ink should (1) have the rheological properties which result in good printing characteristics, and (2) should result in a resistive element which has the appropriate electrical properties, has the appropriate physical properties, i.e., is durable, flexible and not brittle, and has good stability over time. The key test used to predict stability over time is a post-cure process, where resistance before and after the post-cure is monitored and recorded as percent change. The post-cure can be either boiling water (206°–212° F.; 97°–100° C.) immersion for 10 minutes, or oven post-curing, e.g. 250° F. (121° C.) for 10 minutes. In general, a resistance change of less than 5% in the boiling water test and less than 7% in the oven post-cure test is considered to be quite good.

A. Conductive Metal

Any stable conductive metal with suitable electrical properties can be used in the PTF compositions of the invention. Particularly suitable metals include silver, gold and copper. Mixtures of the metals can also be used.

The metal particles should be finely divided and have a particle size within the range of 0.1–20 micrometers, preferably within the range of 1–10 micrometers. However, it is essential that the average surface area be in the range of about 0.3 to about 3.0 $m^2/g$, and preferably 0.7 to 1.3 $m^2/g$. The particles may be of either flake or "spherical" configuration, although, generally, a flake configuration provides the necessary surface area.

It should be noted, that some finely divided metal powders, notably silver flake, contain surfactants that are used in the manufacture of the metal particulate form. Although surfactants are not a necessary component in the PTF compositions of the invention, the presence of the surfactant is generally not detrimental.

The metal particles are generally present in an amount of from about 30% to about 75% by weight based on the weight of the ink; preferably from 40% to 50% by weight.

B. Particulate Material

The particulate material is high surface area material which contributes to the resistance stability of the printed resistor. The material should be chemically inert and have a conductivity substantially less than the conductive metal. Examples of suitable materials include carbon black, silica and alumina. Mixtures can also be used. The surface area of the material should be greater than 100 $m^2/g$, preferably about 200 $m^2/g$.

The amount of particulate material present in the PTF composition is determined by the volume ratio of particulate material to polymeric resin. This ratio should be at least 3.5, and preferably greater than 4.0. A preferred amount of particulate material is in the range of 5 to 10% by weight, based on the weight of the ink.

When carbon is used as the particulate material, it also will provide some conductivity to the printed resistor. When a resistive element with low conductivity is needed, it may not be necessary to add further conductive metal to the carbon. Thus the carbon can function both as the electrically conductive filler and the high surface area particulate filler in the PTF ink. Such compositions are also included in the scope of the present invention. When carbon is used as the conductive material and the particulate, high surface area material, the volume ratio of carbon to resin should still be greater than 3.5 and preferably greater than 4.0. In general, the carbon will be present in an amount of about 10 to about 15% by weight, based on the weight of the PTF ink.

C. Resin

The resin is a thermoplastic polymeric material. Suitable resins include phenoxy resins, vinylidene chloride, polyesters, polyurethanes and epoxy resins. Most preferred are phenoxy resins having a molecular weight of greater than about 10,000.

The amount of resin present is balanced with the amount of high surface area material such that the volume ratio of high surface area material to resin is greater than about 3.5 and preferably greater than 4.0. In general, the resin will be 15 to 30% by weight, based on the weight of the organic medium (resin plus solvent plus any other organic materials). Preferably the resin is 18–22% by weight, based on the weight of the organic medium. The organic medium is generally 25 to 75% by weight, based on the weight of the PTF ink.

D. Organic Solvent

The organic solvent serves as the vehicle in which all the other components are dispersed. The volatility of the solvent is an important factor which influences the resistance stability of the printed resistive element. When evaluating the volatility of the solvent, both the base volatility of the solvent alone, and the volatility of the solvent when interacting with the thermoplastic resin should be taken into consideration.

The organic solvent alone should have a volatility rating of greater than about 10,000 seconds to 90% evaporation. The volatility rating is measured as the time to 90% evaporation using a thin-film evaporometer according to ASTM Test D 3539-87, Method B. Solvents which have a volatility rating of less than about 10,000 seconds to 90% evaporation will evaporate too quickly resulting in PTF inks which are not stable, i.e., dry out too quickly. Solvents which have a very high volatility rating will be likely to evaporate too slowly resulting in poor resistance stability as measured by post-cure tests. A preferred range for the volatility rating is between about 10,000 and 50,000 seconds to 90% evaporation.

The volatility of the solvent in combination with the thermoplastic resin should be such that the PTF can be substantially cured within 2.5 minutes by heating to a temperature of 135° C. By "substantially cured" it is meant that no more than 5% of the solvent in the ink remains after the heating step.

Examples of suitable solvents include aromatic and aliphatic hydrocarbons, esters, acetates, glycol ethers, and glycol ether acetates. A preferred solvent is dipropylene glycol monomethyl ether, having a volatility rating of about 16,000 seconds to 90% evaporation.

The solvent is generally 70 to 85% by weight, based on the weight of the organic medium (resin plus solvent plus any other organic materials). Preferably the resin is 78–82% by weight, based on the weight of the organic medium. The organic medium is generally 25 to 75% by weight, based on the weight of the PTF ink.

Dispersants can be included with the solvent to prevent agglomeration of the particulate materials. Any conventional dispersants can be used. Preferred dispersants are fatty acid derivatives. The dispersant is generally present in an amount of about 0.1 to 1.0% by weight, based on the weight of the PTF ink.

Other additives may be included with the solvent to improve the printing characteristics of the ink as long as they do not adversely affect the electrical properties and stability of the resulting resistive element. The additives include stabilizers, plasticizers, wetting agents, deaerators, foam inhibitors, and the like.

E. Substrate

The substrate used for printing the resistive elements can be almost any substrate suitable for the electronic application intended. The substrate should be stable up to about 150° C. The thickness of the substrate is governed by the end use. Examples of suitable substrates include polyester, polyaramid, polycarbonate, polyimide, polyether sulfone, polyether ether ketone, and FR4 (epoxy/glass laminate). Polyester substrates are preferred.

F. Ink Preparation and Printing

In the preparation of the compositions of the present invention, the particulate solids are mixed with the resin, organic solvent and any other additives and dispersed with suitable equipment, such as a three-roll mill. This results in a suspension of the solids in the organic medium, i.e., the PTF ink.

The ink composition is then applied to a substrate, such as polyester, by a screen printing process. The printed material is dried, typically at 120° to 145° C. for 2 to 3 minutes.

The following examples further illustrate the present invention.

EXAMPLES

| Materials | |
|---|---|
| Carbon | Carbon powder having a surface area of 200 $m^2/g$ |
| Dispersant | Mixture of 30% N-tallow-1,3-propanediamine dioleate and 70% tallow oils |
| Phenoxy | Polyhydroxyether polymer, MW = 10,000 to 30,000 |
| Polyester | Polymer of dimethyl terephthalate/ethylene glycol/isophthalic acid/neopentyl glycol |
| Polyurethane | Polyester urethane elastomer; Q-Thane\, K. J. Quinn & Co., (Malden, MA) |
| Vinylidene | Copolymer of vinylidene chloride and acrylonitrile |
| Silica | Fumed silica having a surface area of 300 $m^2/g$ |
| Silver | Silver flake having a surface area of 0.90 $m^2/g$ |
| Solvent I | Cyclohexanone, having a volatility rating of 10,000 |
| Solvent II | Dipropylene glycol monomethyl-ether, having a volatility rating of 16,000 |
| Solvent III | Ethylene diacetate, having a volatility rating of 21,000 |
| Solvent IV | Mixture of aliphatic dibasic acid esters, MW _156, having a volatility rating of 49,000 |
| Solvent V | Diethylene glycol monomethyl-ether acetate, having a volatility rating of 76,000 |

Resistive Element

The medium (containing solvent, dissolved polymer, and other additives), high surface area particulate material, and conductive metal, if present, were mixed together. The mixture was then placed on a three roll-mill where proper dispersion of all the particulates was achieved. The resistive ink was then screen printed onto a 5.0 mil thick polyethylene terephthalate substrate in a wedge-shaped pattern and cured for 2.5 minutes at 135° C.

A conductive PTF silver ink, Du Pont 5007 (E. I. du Pont de Nemours & Co., Wilmington, Del.), was printed onto the cured printed substrate and cured as above. Subsequently, a UV-curable PTF dielectric ink, Du Pont 5014 (E. I. du Pont de Nemours & Co., Wilmington, Del.), was printed over this and exposed to UV radiation at 750 $mW/cm^2$. The dielectric encapsulated the resistive pattern.

The entire circuit was then cured for an additional 2.5 minutes at 135° C., and the subsequent resistance was measured as $R_0$.

Test Procedures

Boiling Water Post-Cure Test:

The cured circuit, in which the printed PTF resistor layer had been overcoated with dielectric, was immersed in boiling water for a period of 10 minutes. After drying, the resistance was measured again. The percent change in resistance relative to $R_0$ was determined. A change of 5% or less was considered to be satisfactory.

Oven Post-Cure Test:

The cured circuit, in which the printed PTF resistor layer had been overcoated with dielectric, was heated to a temperature of 121° C. for 10 minutes. The resistance was then measured again. The percent change in resistance relative to $R_0$ was determined. A change of 7% or less was considered to be satisfactory.

Example 1

This example illustrates the use of a PTF resistor ink in which carbon is the only conductive material.

The PTF ink had the following composition, (where the percentages are by weight based on the weight of the PTF ink):

| | |
|---|---|
| Carbon | 11.5% |
| Medium | 88.0% |
| Dispersant | 0.5% |

The medium had the following composition (where the percentages are by weight based on the weight of the medium):

| | |
|---|---|
| Phenoxy Resin | 20% |
| Solvent II | 80% |

The volume ratio of carbon to resin was 4.7.

The resistance changes in the post-cure tests were as follows:

| | |
|---|---|
| Boiling Water Test | 1.0% |
| Oven Test | 0.5 |

When large sheets of the resistor pattern were printed, they were found to have a small coefficient of variation across the sheet, i.e., they had good linearity.

Example 2

This example illustrates the effect of the carbon to resin ratio on the post-cure resistance changes.

PTF resistor inks were made having the following compositions (where the percentages are by weight based on the weight of the PTF ink):

| | Example | | | | |
|---|---|---|---|---|---|
| Component | 2A | 2B | 2C | 2D | 2E |
| Silver | 44.0 | 44.0 | 44.0 | 42.0 | 44.0 |
| Carbon | 3.0 | 4.2 | 5.0 | 6.5 | 7.0 |
| Dispersant | 1.0 | 1.0 | 1.0 | 0.5 | 0.5 |
| Phenoxy | 10.4 | 10.2 | 10.0 | 10.2 | 9.7 |
| Solvent II | 41.6 | 40.6 | 40.0 | 40.8 | 38.8 |

The carbon/resin volume ratios and the resulting post-cure test results are given below. The data clearly indicate that when the carbon/resin volume ratio is less than 3.5 (Examples 2A and 2B) the resistance change is outside the acceptable limit in the post-cure tests.

| | | % Resistance Change | |
|---|---|---|---|
| Example | Carbon/Resin | Boiling Water | Oven |
| 2A | 2.0 | 27.0 | 10.4 |
| 2B | 3.0 | 11.0 | 7.8 |
| 2C | 4.0 | 7.9 | 6.9 |
| 2D | 4.5 | 4.2 | 6.9 |
| 2E | 5.1 | 2.0 | 4.5 |

When large sheets of the resistor pattern were printed using the compositions in Examples 2C-E, they were found to have a small coefficient of variation across the sheet, i.e., they had good linearity.

Example 3

This example illustrates the use of different thermoplastic resins in the PTF ink compositions of the invention.

PTF resistor inks were made having the following compositions (where the percentages are by weight based on the weight of the PTF ink):

| | Comparative Example | | |
|---|---|---|---|
| Component | 3A | 3B | 3C |
| Silver | 44.0 | 38.0 | 37.2 |
| Carbon | 7.0 | 6.7 | 6.8 |
| Dispersant | 0.5 | 0.5 | 0.5 |
| Phenoxy | 9.7 | — | — |
| Vinyl | — | 11.2 | — |
| Polyester | — | — | 5.7 |
| Polyurethane | — | — | 10.8 |
| Solvent II | 38.8 | 44.6 | 39.0 |
| Carbon/Resin (v/v) | 5.1 | 3.6 | 3.5 |

The post-cure test results are given below. The phenoxy and the vinylidene chloride resins give superior postcure resistance stability. It should be noted that acceptable results can be obtained with the polyester/polyurethane resin if other components are adjusted (e.g., the carbon/resin volume ratio is increased).

| | % Resistance Change | |
|---|---|---|
| Example | Boiling Water | Oven |
| 3A | 2.0 | 4.5 |
| 3B | 3.8 | 1.6 |
| 3C | 10.5 | 12.2 |

Example 4

This example illustrates the effect of solvent volatility on the post-cure resistance stability.

PTF resistor inks were made having the following compositions (where the percentages are by weight based on the weight of the PTF ink):

| Component | 4A | 4B | 4C | 4D |
|---|---|---|---|---|
| Silver | 44.0 | 44.0 | 44.0 | 44.0 |
| Carbon | 7.0 | 7.0 | 7.0 | 7.0 |
| Dispersant | 0.5 | 0.5 | 0.5 | 0.5 |
| Phenoxy Resin | 9.7 | 9.7 | 9.7 | 9.7 |
| Solvent I | 38.8 | — | — | — |
| Solvent II | — | 38.8 | 13 | — |
| Solvent III | — | — | — | — |
| Solvent IV | — | — | 38.8 | — |
| Solvent V | — | — | — | 38.8 |
| Carbon/Resin (v/v) | 5.1 | 5.1 | 5.1 | 5.1 |

The post-cure test results are given below. The data clearly indicate the improvement in post-cure stability with solvents having a volatility rating in the range of 10,000 to 50,000 (Examples 4A, 4B, 4C, and 4C). As the volatility rating is increased above 50,000 (Example 4E), the percent resistance change begins to rise and continues to rise.

| | % Resistance Change | |
|---|---|---|
| Example | Boiling Water | Oven |
| 4A | 2.5 | 2.2 |
| 4B | 2.4 | 2.1 |
| 4C | 1.9 | 2.4 |
| 4D | 4.7 | 5.6 |

Example 5

This example illustrates the use of a different high surface area particulate material in the PTF inks of the invention.

PTF resistor inks were made having the following compositions (where the percentages are by weight based on the weight of the PTF ink):

| | Example | |
|---|---|---|
| Component | 5A | 5B |
| Silver | 44.0 | 30.0 |
| Carbon | 7.0 | — |
| Silica | — | 3.5 |
| Dispersant | 0.5 | 0.5 |
| Phenoxy | 9.7 | — |
| Vinylidene | — | 13.1 |
| Solvent II | 38.8 | 52.9 |
| Particulate Resin (v/v) | 5.1 | 3.5 |

The post-cure test results are given below. The data clearly indicate that high surface area particulate material other than carbon black can be used to provide good post-cure stability.

| | % Resistance Change | |
|---|---|---|
| Example | Boiling Water | Oven |
| 5A | 2.1 | 2.2 |
| 5B | 2.3 | 2.0 |

Example 6

This example illustrates a different PTF ink composition according to the invention.

A PTF resistor ink was made having the following composition (where the percentages are by weight based on the weight of the PTF ink):

| Component | Wt. % |
|---|---|
| Silver | 44.0 |
| Carbon | 7.0 |
| Dispersant | 0.5 |
| Vinyl Resin | 12.5 |
| Solvent III | 50.0 |
| Carbon/Resin (v/v) | |

The post-cure test results are given below., showing excellent post-cure stability.

| | % Resistance Change | |
|---|---|---|
| Example | Boiling Water | Oven |
| 6A | 2.8 | 1.1 |

What is claimed is:

1. A polymer thick film resistor composition consisting essentially of:
   (1) finely divided conductive metal particles having a surface area of 0.3 to 3.0 $m^2/g$,
   (2) finely divided material non-metallic particles having a surface area greater than 100 $m^2/g$, said particles (a) being chemically inert and (b) having a conductivity substantially less than the conductive metal, and
   (3) a thermoplastic phenoxy resin dissolved in an organic solvent having a volatility rating according to ASTM Test D 3539-87 greater than 10,000 seconds to 90% evaporation, wherein the composition is substantially cured within 2.5 minutes by heating to a temperature of 135° C., and the volume ratio of non-metallic particulate material to phenoxy resin is at least 3.5, and the weight ratio of solvent to phenoxy resin is 3:1 to 5:1.

2. The composition of claim 1 wherein the conductive metal is selected from the group consisting of silver, gold, copper and mixtures thereof.

3. The composition of claim 1 wherein the conductive metal has a surface area of 0.7 to 1.3 $m^2/g$.

4. The composition of claim 1 wherein the non-metallic particulate material is selected from the group consisting of carbon, silica, alumina and mixtures thereof.

5. The composition of claim 1 wherein the non-metallic particulate material has a surface area greater than 200 $m^2/g$.

6. The composition of claim 7 wherein the solvent has a volatility rating of 10,000 to 50,000 seconds to 90% evaporation.

7. A resistive element comprising a substrate having printed thereon a layer of the composition of claim 1, said layer having been heated to effect removal of the solvent and conversion of the composition to a solid state.

8. The composition of claim 1 suitable for fabricating the resistor element of a voltage indicator comprising:

(1) finely divided silver particles having a surface area of 0.3 to 3.0 $m^2/g$, (2) finely divided electrically conductive carbon particles having a surface area greater than 100 $m^2/g$, and (3) a phenoxy resin dissolved in (4) an organic solvent having a volatility rating according to ASTM Test D 3539-87 of 10,000 to 50,000 seconds to 90% evaporation;

wherein the composition is substantially cured within 2.5 minutes by heating to a temperature of 135° C., and the volume ratio of carbon to phenoxy resin is at least 3.5, and the weight ratio of solvent to phenoxy resin is 3:1 to 5:1.

9. A polymer thick film resistor composition consisting of:

(1) finely divided of electrically conductive carbon particles having a surface area greater than 100 $m^2/g$, and (2) a thermoplastic phenoxy resin dissolved in (3) an organic solvent having a volatility rating according to ASTM Test D 3539-87 greater than 10,000 seconds to 90% evaporation, wherein the composition is substantially cured within 2.5 minutes by heating to a temperature of 135° C., and the volume ratio of carbon to phenoxy resin is at least 3.5, and the weight ratio of solvent to phenoxy resin is 3:1 to 5:1.

10. The composition of claim 19 wherein the carbon particles have a surface area greater than 200 $m^2/g$.

11. The composition of claim 9 wherein the solvent has a volatility rating of 10,000 to 50,000 seconds to 90% evaporation.

12. A resistive element comprising a substrate having printed thereon a layer of the composition of claim 9, said layer having been heated to effect removal of the solvent and conversion of the composition to a solid state.

* * * * *